United States Patent [19]

Richmond

[11] 3,801,982

[45] Apr. 2, 1974

[54] POST STORAGE RANGE AND DOPPLER CORRELATION METHOD AND APPARATUS

[75] Inventor: Martin R. Richmond, Belmont, Mass.

[73] Assignee: Sanders Associates, Inc., Nashua, N.H.

[22] Filed: Apr. 22, 1968

[21] Appl. No.: 723,223

[52] U.S. Cl. ................ 343/9, 235/181, 343/17.1 R, 343/17.2 R

[51] Int. Cl. ................ G01s 9/50

[58] Field of Search ........... 343/5 DP, 9, 17.1, 17.2, 343/100.7; 235/181

[56] References Cited

UNITED STATES PATENTS 3,208,065 9/1965 Gutleber et al. .................. 343/17.1

*Primary Examiner*—Malcolm F. Hubler
*Attorney, Agent, or Firm*—Louis Etlinger; Richard I. Seligman

[57] ABSTRACT

Apparatus is herein disclosed for processing signals by storing and correlating with preset programs. The apparatus is disclosed as it relates to a pulse doppler radar application. Target reflected coded signals modulated by doppler are partly correlated to resolve ranges which are ambiguous with relation to one remaining uncorrelated code. The partly correlated signals are stored in a magnetic core matrix. A series of stitching networks wired (or stitched) for various dopplers are coupled to the core matrix via a series of sense inversion switches which are set by a shift register in accordance with the remaining uncorrelated code. The stitch networks compare the stored code time histories as altered by the sense inversion switches with preset codes representing doppler.

16 Claims, 1 Drawing Figure

PATENTED APR 2 1974 3,801,982
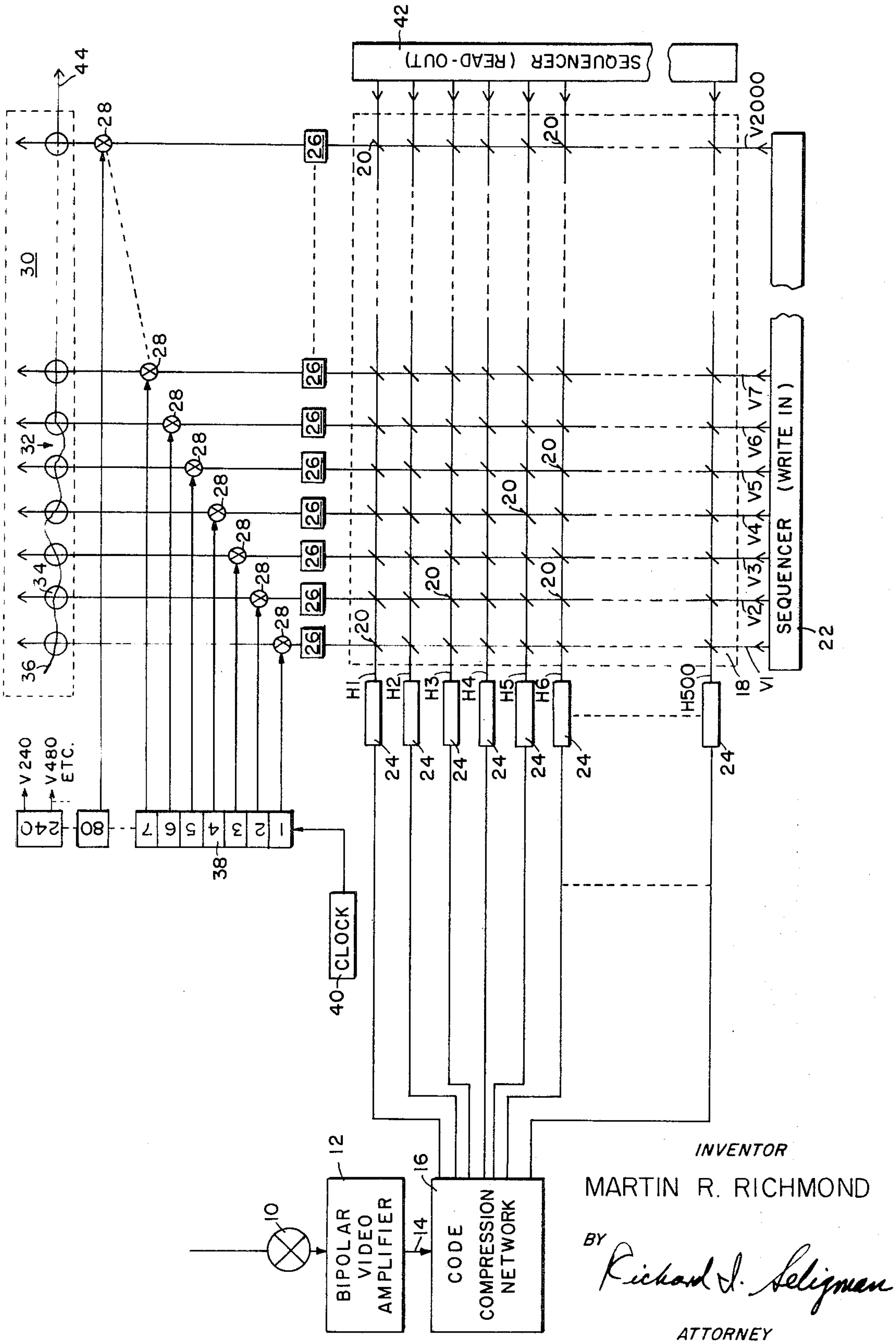
INVENTOR
MARTIN R. RICHMOND
BY Richard I. Seligman
ATTORNEY

POST STORAGE RANGE AND DOPPLER CORRELATION METHOD AND APPARATUS

BACKGROUND OF THE INVENTION

Apparatus has been previously disclosed in which to correlate doppler and range in radar signal processing equipment by storing coded signals containing doppler and range information in an orthogonal magnetic core matrix and applying the stored signals to correlating networks arranged to recognize particular signals applied thereto. The orthogonal core matrix has a multiplicity of horizontal row wires and vertical column wires threading a multiplicity of magnetic cores, one core being placed at the intersection of each row and column. Coupled to the storage matrix is a correlator comprising a plurality of correlating networks each made up of magnetic cores stitched (wired) in such a manner so as to algebraically sum the presented samples of signals to be recognized, to thus produce a maximized output signal when a particular signal to be recognized is applied thereto. If, for example, 240 possible ranges are to be resolved and there is a possibility of 100 different dopplers, then a correlating network is required for each range-doppler combination or (240 × 100) 24,000 individual correlating networks are required.

Such a system is described in a co-pending patent application of Thomas P. Cutler, Ser. No. 665,069, filed Sept. 1, 1967 entitled "Post Storage Range and Doppler Correlation Method and Apparatus" and assigned to the assignee of this application.

Such a system while providing excellent results does require a large amount of correlator stitching. In each correlating network there might be as many as 2000 cores. Thus, in this case the entire correlator of 24,000 correlating networks would require 48 million cores.

SUMMARY OF THE INVENTION

Accordingly, it is an object of this invention to provide an improved correlating arrangement.

It is another object of this invention to provide apparatus for reducing the stitching required in a magnetic core correlator.

It is a further object of this invention to provide a range and doppler processor having reduced stitching.

Briefly, the invention comprises a method and apparatus for reducing the stitching required in an orthogonal core matrix correlator. Rather than stitch the correlating network for all possible range and doppler combinations, a shift register is stitched for the range code, and sense inversion switches are set to correlate the output of the orthogonal core matrix prior to entering the correlating networks so that the correlating networks need only be stitched for the various dopplers, which in the instant example is 100, thus requiring a maximum of 200,000 cores.

The above mentioned and other features and objects of this invention will become more apparent by reference to the following description taken in conjunction with the accompanying drawing, which is a block diagram of an improved range and doppler processor including an orthogonal storage matrix and a range and doppler correlator.

DESCRIPTION OF A PREFERRED EMBODIMENT

In a typical radar application in which the transmitted signal is comprised of a plurality of pseudo-random phase inversion codes superimposed on each other, the receiver must correlate the return signals to reduce the codes to resolve range and doppler of targets.

In the aforementioned patent application Ser. No. 665,069 a range and doppler processor is described for reducing the codes of a three code signal in order to resolve range and doppler. In that application the transmitted signals are made up of first, second and third codes. The first or high speed code is comprised of 10 bits, each bit 10 nanoseconds wide. This code is modulated by a second code comprised of 50 bits, each bit 100 nanoseconds wide. This second code modulates the first code so as to permit the first code either to be inverted or pass as originally generated. The resultant signal is in turn modulated by a third code of 240 bits, each bit 5 microseconds long. Employing this signal permits resolving ranges of 5 feet within 600,000 feet. In the referenced application, the first code is removed employing passive compression techniques and the second code is removed by employing active correlation techniques. The resultant signal which contains range resolved 5 feet within 2500 and modulated by doppler is stored in a magnetic core matrix comprised of 1 million cores arranged at the intersection of 2000 vertical columns and 500 horizontal rows. The horizontal range lines of the magnetic core matrix are read out sequentially into a correlator comprising a plurality of correlator networks, one correlator network for each ambiguous range-doppler combination. If there are 100 doppler codes per range code, 100 stitchings is required to handle each range interval and 100X 240 or 24,000 stitchings covers all ranges and dopplers from 0 to 600,000 feet.

Referring now to the FIGURE, there is illustrated thereby a typical processor for reducing received signals to derive therefrom range and doppler of detected targets.

The input signals to the processor which in the instant example are made up of three codes plus doppler is derived at the output of a mixer 10 and applied to a video amplifier 12 which amplifies both the negative and positive pulses of the received signal. The signal output from video amplifier 12 taken at line 14 is applied to a code compression network 16 where the signal is partly correlated or compressed to remove the first and second codes. The compression technique employs passive and/or active correlation as set forth in detail in said patent application 665,069. The outputs from code compression network 16 are applied to the horizontal row wires H1–H500 of an orthogonal storage matrix 18. One horizontal row wire is coupled to each output from the code compression network (500). The matrix 18 has 2000 vertical column wires VI–V2000 and includes one magnetic core 20 coupled to each intersection of a horizontal row wire H with a vertical column wire V, thus providing for the storage of one million bits of data. Although matrix 18 is described as having a capability of handling 500 signal trains, this is only for illustration purposes, and more or less signal trains could be handled by merely adding or subtracting a proportional number of horizontal rows. Each core 20 is coupled to a particular vertical column VI–V2000 of the matrix. The selection of 2000 vertical columns is illustrative only, and the number of columns can be increased or decreased in proportion to the degree of correlation gain desired.

A signal will be stored (written onto a core 20) when the core is simultaneously excited by an input onto a horizontal row wire H and a write pulse from a sequencer 22 onto the respective vertical column V. The function of the sequencer is to provide write pulses to the vertical column wires in a serial fashion at the rate of the third code and could comprise a simple pulse generator and shift register arrangement. The means 24 for gaining the proper level of signal to be written onto the cores are well-known and are not shown in detail, but could comprise amplifiers, limiters, etc. Reference may be had to my co-pending patent application for "Signal Correlation Apparatus," Ser. No. 486,140, filed Sept. 9, 1965 and assigned to the assignee of this application, wherein such equipment is discussed in detail.

The information written onto the cores 20 of one horizontal row of storage matrix 18 represent resolution of range of five feet within 2500 feet in the instant example. A five foot range gate is represented on each horizontal line of core matrix 18, for example, on horizontal line H1 it is the first five feet in 2500 feet, on line H2, it is the range from five feet to 10 feet in the same 2500 foot element, up to the maximum range of the radar, which, in the instant example, is 600,000 feet or roughly a hundred miles. This information is stored within core matrix 18 and it can be quickly read out for correlation.

Coupled to storage matrix 18 are a plurality of memory devices 26 which in the instant example are either cores or flip-flops. The memory devices provide the current for setting the proportional cores of the correlator networks (described hereinafter). The outputs from memory devices 26 are coupled to a series of sense inversion switches 28.

A correlator 30 is coupled to the sense inversion switches 28 and comprises a multiplicity of stitch networks 32 of magnetic cores 34 so wired (stitched) by a corresponding multiplicity of stitch wires 36 so as to recognize signals applied thereto. The cores 34 of the stitch networks 32 of correlator 30 are stitched in such a manner as to algebraically sum the signals to be recognized to thus produce a maximized output signal from a stitch network when the signal to be recognized is applied thereto. In the preferred embodiment the magnetic cores are small toroidal cores having normal linear transformer magnetic characteristics. Since core switching is not necessary in the stitch networks, vertical driving amplifiers, as well as reverse current drivers can be eliminated. Although toroids are illustrated as the preferred element, any element having multi-level characteristics could be employed with appropriate engineering modifications well known to those skilled in the art.

In my co-pending application, for a "Signal Correlator" Ser. No. 626,164, filed Mar. 27, 1967, and assigned to the assignee of this application, methods of stitching core networks to recognize signals applied thereto are discussed in detail.

Sense inversion switches 28 are also coupled to selective stages of a shift register 38. The numbers of stages of shift register 38 correspond to the number of bits in the third code, which in the instant example is 240. Shift register 38 is driven by a clock arrangement 40. Shift register 38 is stitched for the third pseudo random code and sets the sense inversion switches 28. For example, stage 1 of shift register 38 is coupled to the sense inversion switches 28 coupling columns V1, V241, V481, V721, V961, etc. In like fashion stage 80 of shift register 38 is coupled to the sense inversion switches 38 coupling matrix columns 80, 320, 560, 800, 1040, 1280, 1520, 1760, 2000, with stage 240 of shift register 38 being coupled to sense inversion switches 28, coupling columns V240, V480, V720 etc.

The horizontal rows H1–H500 of storage matrix 18 are sequentially read out by a read-out sequencer 42 and the signal applied to correlator 30 via sense inversion switches 28 which have been set by shift register 38. When a substantially large read-out pulse is applied to a horizontal row wire, the magnetic cores in the particular row which have been previously energized and placed in a 1 state are de-energized and placed back in a 0 state. This is a destructive read-out, which causes pulses to appear on appropriate vertical drive wires. These pulses are applied to sense inversion switches 28 and then summed by the stitch networks 32. Magnetic cores that had been in a 0 state (not energized by incoming signals) are unaffected by the read-out pulse, and no signal appears on those vertical wires. In the event that the characteristics of a signal derived from the horizontal row wires and altered by the sense inversion switches coincide with a particular stitch network, a maximized signal output from the particular stitch network will be obtained. A large pulse will appear at an output 44 for a correct signal (doppler frequency and phase and noise for all other targets at different dopplers. The range is determined by the position of the code in the shift register and can be tied into, for example, a display.

The cores 34 of stitch networks 32 are threaded or stitched by stitch wires 36 so that they will correlate with particular signals applied thereto. The cores of the stitch networks are wired in positive fashion to correlate positive portions of the signals to be recognized and in negative fashion to correlate negative portions of the signals to be recognized.

In this embodiment, wherein the third code is correlated using shift register 38 and sense inversion switches 28, the number of stitch networks required is dependent upon the possible dopplers which can be expected, for example, 100.

It should be noted that a random code could be used on the transmission and set into the shift register. Thus, it is to be understood that the embodiment shown is illustrative only, and that many variations and modifications may be made without departing from the principles of the invention herein disclosed and defined by the appended claims.

I claim:

1. A signal processor for processing signals made up of more than one code, comprising:

input means;

means coupled to said input means for partly correlating the signals to correlate all but said one code;

means for storing said partly correlated signals; and means coupled to said storage means for correlating said one code, including a shift register stitched in accordance with said one code selected stages of said shift register being coupled to predetermined portions of said storage means.

2. A signal processor as defined in claim 1, in which said correlation means further includes:

a clock coupled to the input of said shift register; and a plurality of sense inversion switches, one coupled to each stage of said shift register, said sense inversion switches also being coupled to said storage means.

3. A signal processor as defined in claim 2, in which said means for storing said partly correlated signals includes:

an orthogonal storage matrix comprising a multiplicity of bi-stable logic elements arranged in rows and columns, an electrical conductor connected to the bi-stable logic elements of each row of bi-stable logic elements, an electrical conductor connected to the bi-stable logic elements of each column of bi-stable logic elements; and means for applying said partly correlated signals to said orthogonal storage matrix.

4. A signal processor as defined in claim 3, in which said means for applying said partly correlated signals to said orthogonal storage matrix includes means for sequentially applying write pulses to the conductors connecting said columns of bi-stable logic elements simultaneously with the application of said partly correlated signals to the conductors connecting said rows of bistable logic elements, said write pulses being applied at the rate at which said one code was generated.

5. A signal processor as defined in claim 4, in which said bi-stable logic elements are magnetic cores.

6. In a pulse doppler radar system in which the transmitted signal is comprised of a first code modulated by at least one other code, each code representing different size range intervals, a receiver signal processor, comprising:

input means;

means coupled to said input means for partly correlating received target reflected signals to remove all but one code, thus acquiring fine range resolution in one broad ambiguous range interval;

means for storing said partly correlated signals;

means for correlating said one code in said stored signals; and a signal correlator coupled to said means for correlating said one code, said signal correlator resolving doppler.

7. A signal processor as defined in claim 6, in which said signal correlator includes at least one correlation network having a plurality of multi-level elements, each correlation network grouped to sum substantially all of a multiplicity of simultaneously presented pulses representing phase characteristics as a function of time of a particular signal only.

8. A signal processor as defined in claim 7, in which said multi-level elements are toroids having linear transformer magnetic characteristics.

9. A signal processor as defined in claim 6, in which said storing means includes:

an orthogonal storage matrix comprising a multiplicity of bi-stable logic elements arranged in rows and columns, an electrical conductor connected to the bi-stable logic elements of each row of bi-stable logic elements, an electrical conductor connected to the bi-stable logic elements of each column of bi-stable logic elements; and means for applying said partly correlated signals to said orthogonal matrix.

10. A signal processor as defined in claim 9, in which said means for correlating said one code includes means coupling said storage means and said signal correlator for sense inverting selected bits of said stored signals.

11. A signal processor as defined in claim 10, in which said sense inverting means includes a plurality of sense inversion switches coupling the column electrical conductors of said storage matrix and said signal correlator and means for actuating selected ones of said sense inversion switches.

12. A signal processor as defined in claim 11, further including a plurality of memory devices, one coupling each row electrical conductor to its respective sense inversion switch.

13. A signal processor as defined in claim 11, in which said means for actuating selected one of said sense inversion switches includes a shift register.

14. A signal processor as defined in claim 13, in which said shift register is wired in accordance with said one code.

15. A signal processor as defined in claim 14, further including means for advancing said one code through said shift register.

16. A method for resolving range and doppler of received target signals after transmitting a signal comprising a first code modulated by one or more codes, comprising the steps of:

compressing the received signals to remove all but one code;

storing the partly correlated signals;

altering the stored signals to remove said one code; and summing the resultant signals in accordance with predetermined programs representing various dopplers.

* * * * *